(12) United States Patent
Yuan et al.

(10) Patent No.: US 11,074,159 B1
(45) Date of Patent: Jul. 27, 2021

(54) SYSTEM FOR TESTING IMPACT OF CODE MODIFICATIONS

(71) Applicant: AMAZON TECHNOLOGIES, INC., Seattle, WA (US)

(72) Inventors: Changhai Yuan, Vancouver (CA); Paul Connell, North Vancouver (CA); Phillip Segel, Auburn, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 146 days.

(21) Appl. No.: 16/117,485

(22) Filed: Aug. 30, 2018

(51) Int. Cl.
*G06F 11/36* (2006.01)

(52) U.S. Cl.
CPC ...... *G06F 11/3684* (2013.01); *G06F 11/3688* (2013.01)

(58) Field of Classification Search
CPC .......................... G06F 11/3684; G06F 11/3688
USPC .......................................................... 714/38.1
See application file for complete search history.

(56) References Cited

U.S. PATENT DOCUMENTS

2017/0244743 A1* 8/2017 Key .................... H04L 63/1425

OTHER PUBLICATIONS

Wikipedia "packet analyzer page" from Apr. 28, 2018, retrieved using the way back machine from https://web.archive.org/web/20180426203230/https://en.wikipedia.org/wiki/Packet_analyzer (Year: 2018).*

Wikipedia network simulation page, retrieved from https://en.wikipedia.org/wiki/Network_simulation (Year: 2021).*

* cited by examiner

*Primary Examiner* — Yair Leibovich
(74) *Attorney, Agent, or Firm* — Lindauer Law, PLLC

(57) ABSTRACT

Techniques for determining the ability of a modified set of processes to process requests received by an initial set of processes include dividing the requests received by the initial processes into subsets. Each subset includes requests having common values for a set of request parameters. Test data is generated that includes at least one request from each subset. The test data is processed by the modified processes to determine responses. If the response for a request that is determined by the modified processes corresponds to the response for that request that was determined by the initial processes, this correspondence indicates that the modified processes may generate a proper response for each request included in the same subset as the tested request. As a result, the ability of the modified processes to replace the initial processes may be tested using only a portion of the requests received by the initial processes.

20 Claims, 6 Drawing Sheets

SYSTEM FOR TESTING IMPACT OF CODE MODIFICATIONS

BACKGROUND

When a set of processes or other software code used to process requests is modified, the modifications may cause the processes to improperly process one or more types of requests.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
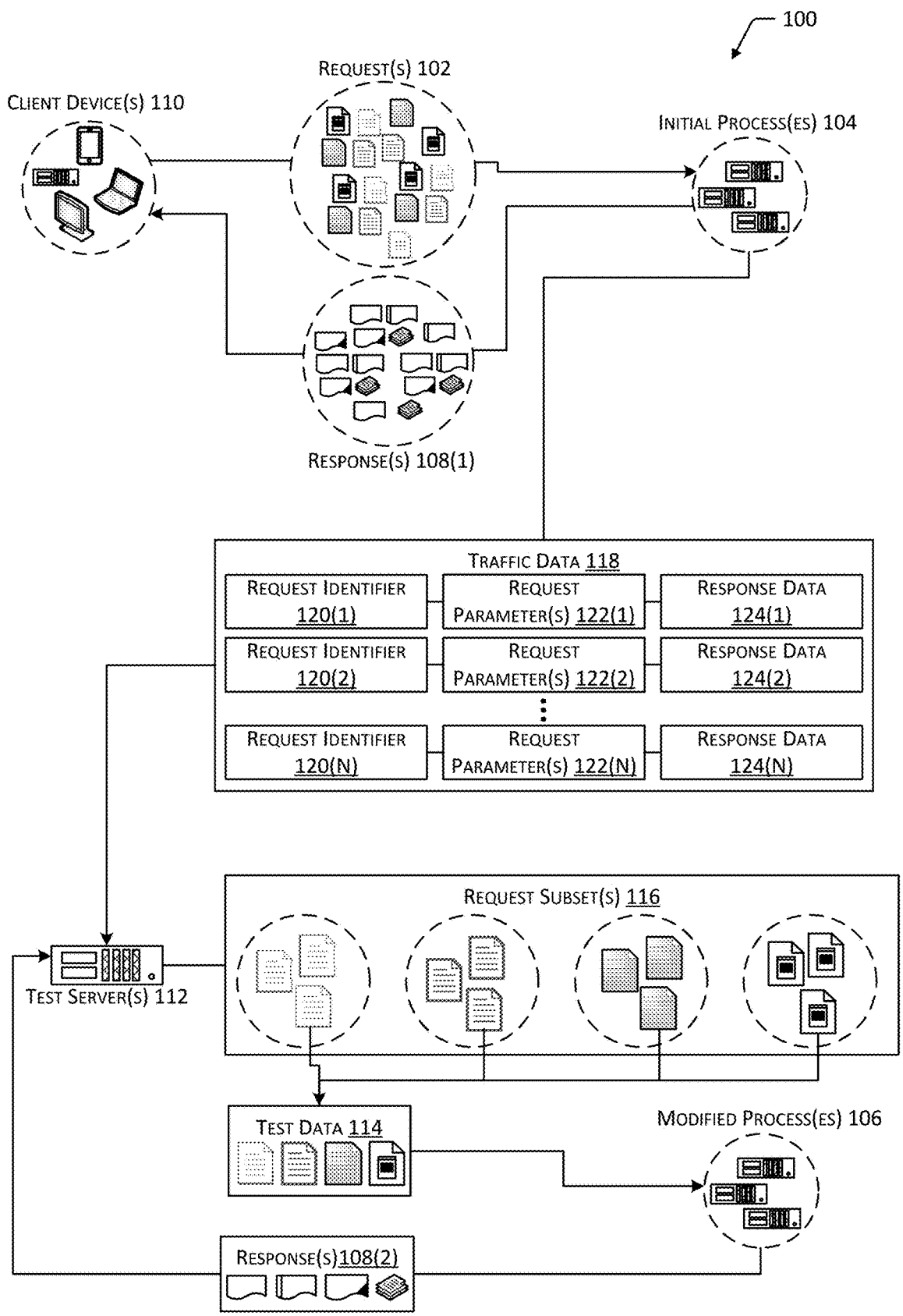
FIG. 1 depicts an implementation of a system for determining a subset of the requests processed by a set of initial processes to be used to test the output produced by a set of modified processes.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

Numerous websites may process various types of requests (e.g., transactions or other types of traffic) to produce various types of outputs (e.g., responses). For example, an online store may use various sets of processes (e.g., a software stack) to conduct purchases, payments, and so forth. For example, an online store may include a collection of network-accessible services executed on computer hardware. The services may provide multiple channels through which customers, using a client computing device, may access various catalogs stored in databases to find products and services available to purchase, lease, and so forth. Channels for accessing catalogs may include, for example, mobile applications, voice-based search programs, web pages, and so forth. The particular processes, sub-processes, and code that is executed within various processes and sub-processes may vary depending on parameters of the request that is processed. Continuing the example, the processes or code that are executed to complete a purchase of an electronic good, such as an e-book, may differ from the processes or code executed to complete a purchase of a movie, which may differ from the processes or code executed to complete a purchase of a physical good, such as a clothing item. A potentially large number of processes, services, or other types of code may be used to generate outputs based on received requests, and the relationships between processes may not necessarily be known. Additionally, numerous inputs and different types of inputs may be used to determine a response to one or more requests. As such, when it is desired to modify an existing set of processes or test a modification to the processes, such as to support new business uses or to scale the processes to accommodate a larger quantity of traffic, it may not be readily apparent whether a modification to a set of processes will affect the manner in which one or more types of requests are processed.

In some cases, the ability of a modified set of processes to process received requests may be tested by using the modified processes to determine outputs based on the requests received by the initial set of processes. The process of transmitting a copy of the requests from an initial set of processes to an alternate system where a modified set of processes are used to process the copied requests may be colloquially referred to as "shadow testing" the modified set of processes. If the outputs determined by the modified processes are the same as those determined by the initial set of processes, this may indicate that the modified set of processes is capable of properly processing the received requests. However, in cases where a very large number of requests is received, such as an online store that receives thousands of requests per second, it may be computationally prohibitive or may consume significant quantities of time and resources to test all of the requests received by a system. Additionally, processing large quantities of traffic for test purposes may represent a significant financial expense due to the time, computing devices, and personnel used for such a purpose.

Described in this disclosure are techniques for testing the effectiveness of a modified set of processes by using the modified set of processes to determine an output based on a selected subset of the requests processed by an initial set of processes. Traffic data for an initial set of processes may be accessed to determine the requests that are processed by the initial set of processes and the corresponding outputs determined for each request. For example, the traffic data may indicate a first output related to a completed purchase transaction for an electronic good using a first type of payment mechanism at a first location and a second output related to a completed purchase transaction for a physical good using a second type of payment mechanism at a second location. The requests associated with the traffic data may be analyzed to determine values for multiple parameters of each request. A parameter of a request may include a data field associated with the request, such as an indication of a type of good or service associated with a purchase transaction, a type of payment mechanism used, a location associated with a buyer or seller, and so forth. Parameters may also include characteristics of the devices or applications used to communicate with the system that processes the requests, metric values associated with the processing of the request, such as latency, and so forth. In some implementations, parameters of a request may include the code that is executed to process the request. For example, the code that is executed to process a request may include multiple junctions (e.g., nodes), where different code may have been executed, and an indication of the specific code path associated with each junction may be stored in association with a request. In some implementations, a parameter for a request may not be determined from the traffic data, but through use of another source of data. For example, a value for a first request parameter, such as an identifier associated with a customer of an online store, may be determined from the traffic data. Correspondence between the traffic data and user data indicative of characteristics of user accounts may then be used to determine other parameters of the request, such as membership of a user account in one or more programs, a location associated with the user account, or other characteristics associated with the request.

The parameters for the requests and the frequencies associated with values for each parameter may be analyzed to determine the importance of each parameter. For example, a parameter having a unique value for all or substantially all of the requests, such as an identifier indicative of a customer purchasing an item, may not be useful in differentiating types of requests from other types of requests. Similarly, a parameter having a value that is common to all or substantially all of the requests may also not be useful in differentiating types of requests from other types of requests. However, if a particular value for a parameter occurs in a portion of the requests greater than a threshold minimum portion and less than a threshold maximum portion, the value may be useful for differentiating types of requests from other types of requests.

After parameters of importance have been determined, requests that share values for each parameter of importance may be grouped into subsets. For example, all transactions to purchase an e-book using a credit card from a location within the continental United States may be grouped into a first subset, while transactions to purchase an e-book using a bank transfer payment from a location within the continental United States may be grouped into a second subset. Any number of subsets may be determined, each subset being defined by a set of parameter values common to each request within the subset. The modified set of processes may then be used to determine a process output associated with a single request from each subset. If the process output for the single request from a particular subset corresponds to the output determined for that request when processed using the initial set of processes, then the modified set of processes may be determined to properly process requests from the particular subset. In this manner, the effectiveness of a modified set of processes may be determined by processing only a single request from each subset rather than all of the requests associated with the traffic data. In other implementations, more than one request from each subset may be processed using the modified set of processes. For example, processing any number of requests that is less than the total number of requests included in a subset would consume a smaller quantity of time and computational resources than processing every request from a subset.

As one skilled in the art will appreciate in light of this disclosure, certain embodiments may be capable of achieving certain advantages, including some or all of the following: dividing a body of requests received by a set of initial processes into subsets that share common sets of request parameters may enable the efficacy of a modified set of processes to be tested using significantly less time and computational resources than testing all traffic received by the initial processes. For example, a set of modified processes may be used to determine a response for a single request from each determined subset of requests, and the success or failure of the modified processes to determine a proper response may indicate the ability of the modified processes to determine a proper response for each request included in the subset. In addition to conserving time and computational resources, use of the techniques described herein may enable modifications to large scale systems, such as online stores that process thousands of requests per second, to be tested when use of a test system would otherwise be impossible due to the prohibitive quantity of computational resources needed.

FIG. 1 depicts an implementation of a system 100 for determining a subset of the requests 102 processed by a set of initial processes 104 to be used to test the output produced by a set of modified processes 106. A request 102 may include any type of data provided to a computing device executing one or more services or processes for the purpose of generating a response 108. The response 108 associated with a request 102 may include various types of output, such as the modification of data, the presentation of data using one or more output devices, and so forth. For example, a client device 110 may provide a request 102 to one or more computing devices executing a set of initial processes 104 to complete a purchase transaction for an item available via an online store. The response 108 generated by the initial processes 104 may be affected by various characteristics of the request 102. The response 108 may also be affected by characteristics of the client device 110 or other source associated with the request 102. For example, the request 102 may originate from a particular location and may be provided using a particular type of client device 110 or a particular application executing on the client device 110. The request 102 may be associated with the purchase of a particular type of item, may indicate a particular type of payment mechanism to purchase the item, may indicate a particular type of shipment or delivery of the item, and so forth. Different processes of the set of initial processes 104 may be used to generate a response 108 based on the characteristics of the request 102. For example, different portions of computer code may be executed by an initial process 104 based on the request characteristics. Continuing the example, a purchase transaction for an electronic good, such as a digital movie that is purchased using a credit card, may be completed using different portions of a body of code than a purchase transaction for a clothing item that is purchased using a bank transfer payment mechanism. Any number of requests 102 having various characteristics may be received by the initial processes 104 from any number of client devices 110. For example, a set of initial processes 104 associated with an online store may receive and process thousands of requests 102 per second. FIG. 1 depicts the initial processes 104 generating a first set of responses 108(1) based on a large quantity of requests 102 received from client devices 110.

As described previously, in some cases, one or more processes may be added to the set of initial processes 104, removed from the initial processes 104, or one or more of the initial processes 104 may be changed, resulting in a set of modified processes 106. However, a modification to the initial processes 104 may affect the ability of the processes to determine the proper response 108 to one or more types of requests 102. To prevent improper handling of one or more requests 102, the set of modified processes 106 may first be tested before replacing the initial processes 104 with the modified processes 106. However, using the modified processes 106 to process a large quantity of requests 102, for the purpose of testing the capability of the modified processes 106 to determine proper responses 108 to the requests 102, may consume a prohibitively large quantity of time and computational resources and may generate a significant financial cost. As such, one or more test servers 112 or other types of computing devices may be used to generate test data 114 that includes a smaller quantity of requests 102 than the amount received and processed using the initial processes 104. The requests 102 associated with the test data 114 may be selected by categorizing each request 102 received by the initial processes 104 into request subsets 116 based on the characteristics and parameters of each request 102, such that the ability of the modified processes 106 to generate an appropriate response 108 for each request subset 116 may be determined. For example, the test data 114 may include a single request 102 from each determined request subset 116. In other implementations, the test data 114 may include multiple requests 102 from one or more of the request subsets 116.

Specifically, the test server(s) 112 may determine traffic data 118 based on the requests 102 and responses 108 associated with the initial set of processes 104. The traffic data 118 may include an indication of the requests 102 received by the initial processes 104, the characteristics associated with each request 102, and an indication of the response 108 generated based on each request 102. For example, FIG. 1 depicts the traffic data 118 associating a first request identifier 120(1) that may be indicative of a first request 102 with a corresponding set of request parameters 122(1) and corresponding response data 124(1) indicative of the response 108 generated based on the first request 102. Similarly, a second request identifier 120(2) is shown associated with a second set of request parameters 122(2) and second response data 124(2). The traffic data 118 may include any number of request identifiers 120(N), each of which may be associated with a corresponding set of request parameters 122(N) and response data 124(N).

The test server(s) 112 may divide the requests 102 received by the initial processes 104 into request subsets 116 based on common request parameters 122 for each request 102 within a request subset 116. For example, request parameters 122 may include characteristics of the source of a request 102, characteristics of the request 102 itself, portions of code executed when processing the request 102, processing metrics associated with generation of a response 108 for the request 102, and so forth. Examples of request parameters 122 are described with regard to FIG. 3. Continuing the example, a first request subset 116 may include all requests 102 received by the initial processes 104 that relate to purchase transactions for the same type of good and using the same payment mechanism, while a second request subset 116 includes purchases for a different type of good. While FIG. 1 depicts four example request subsets 116, any number of request subsets 116 may be determined based on the traffic data 118. In some implementations, the particular request parameters 122 that are used to divide the requests 102 into request subsets 116 may be determined based on the frequency with which a particular value for a request parameter 122 occurs among the requests 102 received by the initial process 104. For example, if the value for a request parameter 122 is unique for each request 102 or for at least a threshold portion of the requests 102, such as a customer identifier associated with a purchase transaction, the request parameter 122 may not be useful for dividing the requests 102 into request subsets 116 having common request parameters 122. Similarly, if the value for a request parameter 122 is common for each request 102 or for at least a threshold portion of the requests 102, the request parameter 122 may not be useful for dividing the requests 102 into request subsets 116. In some implementations, a request parameter 122 may be used to divide the requests 102 into request subsets 116 if a value for the request parameter 122 occurs in a quantity of requests 102 greater than a threshold minimum portion of the requests 102 and less than a threshold maximum portion of the requests 102.

After the test data 114 has been generated, such as by selecting a single request 102 from each determined request subset 116, the modified processes 106 may be used to determine responses 108(2) based on the requests 102 included in the test data 114. If the response 108(2) for a particular request 102 included in the test data 114 matches the response 108(1) for that request 102 indicated in the traffic data 118, this may indicate that the modified processes 106 are able to properly process and determine a response 108 for each request 102 included in the request subset 116 with which the request 102 from the test data 114 is associated. As such, the ability of the modified processes 106 to determine a proper response 108 for requests 102 may be determined by testing only a small subset of the traffic received by the initial processes 104, significantly conserving time, cost, and computational resources.

Figure 2:
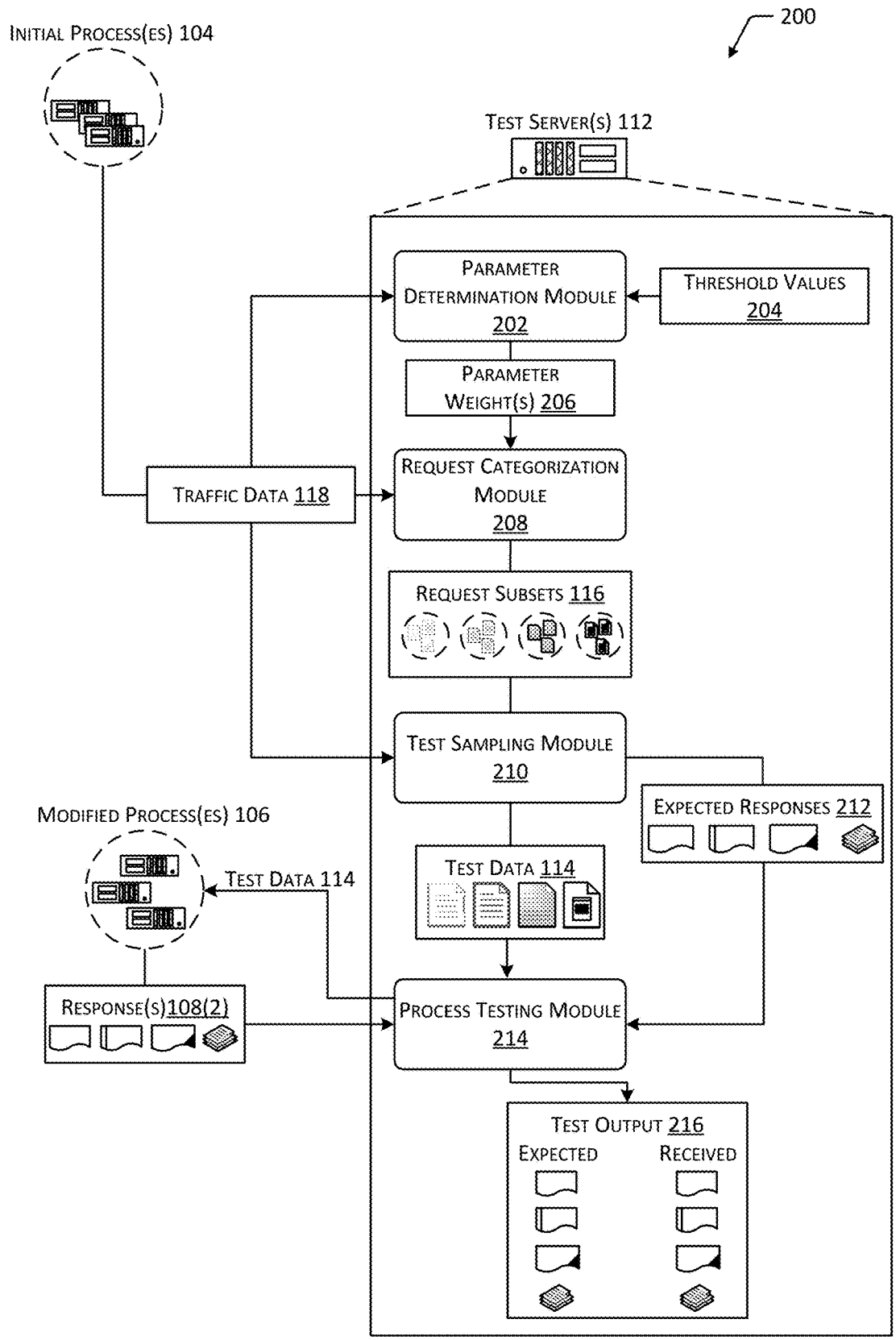
FIG. 2 depicts an implementation of a system for determining the ability of a set of modified processes to properly process a set of requests received by a set of initial processes.

FIG. 2 depicts an implementation of a system 200 for determining the ability of a set of modified processes 106 to properly process a set of requests 102 received by a set of initial processes 104. As described with regard to FIG. 1, a set of initial processes 104 may receive a large quantity of requests 102 from one or more client devices 110. The initial processes 104 may determine responses 108 for the received requests 102. Each request 102 may have various request parameters 122, such as characteristics associated with the source of the request 102, characteristics associated with the request 102 itself, processing metrics associated with generation of a response 108, or the code executed when processing the request 102. A parameter determination module 202 associated with the test server(s) 112 may determine traffic data 118 from the initial processes 104. As described with regard to FIG. 1, the traffic data 118 may associate request identifiers 120 for the requests 102 with corresponding sets of request parameters 122 and corresponding response data 124 indicative of the response 108 to each request 102.

The parameter determination module 202 may determine particular request parameters 122 indicated in the traffic data 118 that may be of use in dividing the requests 102 into request subsets 116. For example, the parameter determination module 202 may determine, based on one or more threshold values 204, particular values for request parameters 122 that occur with a frequency less than a threshold maximum frequency and greater than a threshold minimum frequency. The parameter determination module 202 may determine one or more parameter weights 206 for at least a subset of the request parameters 122. For example, a request parameter 122 having values with frequencies outside of the threshold values 204 may be assigned a parameter weight 206 of zero, while request parameters 122 that may be of particular use dividing the requests 102 into request subsets 116 may be assigned a large parameter weight 206. In other implementations, a parameter weight 206 may not include a quantifiable value and may instead indicate whether a request parameter 122 is to be used to divide the requests 102 into request subsets 116 or whether a particular request parameter 122 is not to be used.

A request categorization module 208 may divide the requests 102 indicated in the traffic data 118 into request subsets 116 based on common sets of request parameters 122 within each subset 116. In some implementations, the request categorization module 208 may access the parameter weights 206, determined by the parameter determination module 202, that indicate the request parameters 122 to be used to form request subsets 116 and in some cases, the importance of one or more of the request parameters 122. For example, a first request parameter 122, such as the indication of a type of good associated with a purchase transaction, may be associated with a lower parameter weight 206 than a second request parameter 122, such as the particular code that is executed to generate a response 108 for the request 102. In some implementations, the parameter weights 206 may be used to determine a score or other type of value indicative of the similarity or difference between particular requests 102.

A test sampling module 210 associated with the test server(s) 112 may generate test data 114 based on the request subsets 116. Specifically, the test sampling module 210 may select one or more requests 102 from each request subset 116 for use testing a set of modified processes 106. In some implementations, one or more rules or parameter weights 206 may be used to determine the particular requests 102 from each request subset 116 used to generate the test data 114. For example, based on the parameter weights 206, requests 102 having a particular value for a particular request parameter 122 may be selected as test data 114. The test sampling module 210 may also determine, based on the traffic data 118, an expected response 212 for each request 102 included in the test data 114. The expected response 212 may include an indication of the response 108 determined for each request 102 by the set of initial processes 104.

A process testing module 214 associated with the test server(s) 112 may provide at least a portion of the requests 102 included in the test data 114 to a set of modified processes 106 and may receive responses 108(2) from the modified processes 106 for each of the requests 102. The process testing module 214 may determine correspondence between the responses 108(2) and the expected responses 212 and generate test output 216 indicative of this correspondence. For example, if the modified processes 106 determine a response 108(2) for a request 102 that matches the expected response 212 for that request 102, the test output 216 may indicate this correspondence. The matching response 108 may indicate that the modified processes 106 are capable of determining a proper response 108 for each request 102 included in the request subset 116 associated with the tested request 102. If the modified processes 106 determine a response 108(2) that differs from the expected response 212, this may indicate that one or more differences between the modified processes 106 and the initial processes 104 have affected the capability of the modified processes 106 to determine proper responses 108 for the requests 102 included in the corresponding request subset 116. If each response 108(2) matches the corresponding expected response 212, the initial processes 104 may be replaced by the modified processes 106. If one or more responses 108(2) do not match the corresponding expected response 212, a notification may be generated indicating the lack of correspondence.

Figure 3:
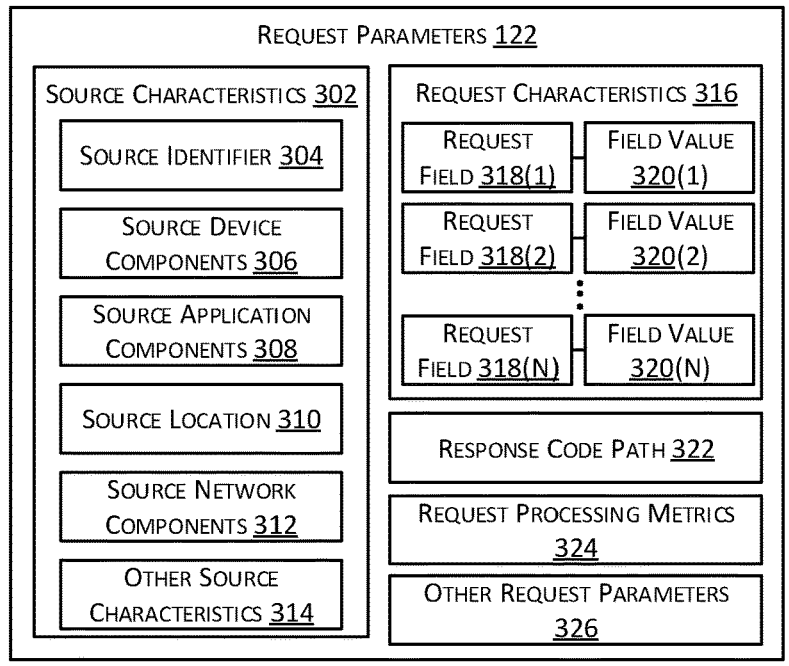
FIG. 3 is a block diagram illustrating example request parameters and parameter weights that may be used to determine test data for use with a set of modified processes.
Figure 3:
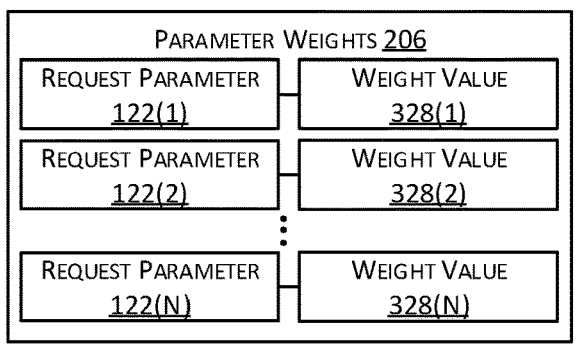

FIG. 3 is a block diagram 300 illustrating example request parameters 122 and parameter weights 206 that may be used to determine test data 114 for use with a set of modified processes 106. As described with regard to FIGS. 1 and 2, each request 102 received by a set of initial processes 104 may be associated with one or more request parameters 122 that may be used to associate the request 102 with a particular request subset 116.

Request parameters 122 may include source characteristics 302, such as characteristics of the client device 110 or application used to provide a request 102 to the initial processes 104. For example, a source characteristic 302 may include a source identifier 304 indicative of the particular client device 110, application, process, or service that generates the request 102 or transmits the request 102 to the initial processes 104. The source identifier 304 may include any manner of alphanumeric data, image data, audio data, or other types of data that may be used to differentiate a particular source of a request 102 from other sources of requests 102.

Source characteristics 302 may also include an indication of one or more source device components 306. For example, the input devices, output devices, or other device components associated with the source of a request 102 may affect the manner in which the request 102 is processed. Continuing the example, a client device 110 lacking a display may be provided with a response 108 that primarily includes audio data or haptic data, while a client device 110 that lacks a speaker may be provided with a response 108 that primarily includes image data or video data and does not include audio data.

Source characteristics 302 may further include source application components 308, which may include an indication of one or more applications, services, processes, code, or other software executing on a client device 110 or other source of a request 102. For example, a client device 110 may access a website and provide a request 102 using a particular type of browser. The manner in which a response 108 to this request 102 is generated may differ from the manner in which a response 108 is generated for requests 102 provided using another type of browser.

Source characteristics 302 may additionally include an indication of a source location 310 associated with the source of a request 102. For example, a network address or other data associated with a client device 110 or other source may be used to determine a location associated with the source. Requests 102 received from particular locations may be processed differently from other requests 102, while responses 108 provided to particular locations may be processed or transmitted differently from other responses 108. For example, particular locations may be associated with a lack of security features, and data exchanged with devices at the particular locations may be analyzed to determine malicious code, encrypted to prevent theft or interception of the data, and so forth.

Similarly, source characteristics 302 may include an indication of source network components 312 used to transmit requests 102 to the initial processes 104 and transmit responses 108 to the sources of the requests 102. For example, the capabilities and security features of the devices and networks through which requests 102 and responses 108 are transmitted may affect the manner in which a request 102 is processed and a response 108 is generated.

Other source characteristics 314 may also affect the manner in which requests 102 are processed. For example, other source characteristics 314 may include user data indicative of previous interactions associated with a user account. Continuing the example, purchase transactions using a credit card from a trusted user account having an extensive purchase history may be processed differently than purchase transactions from a new user account or a user account associated with previous failed payment attempts.

Request parameters 122 may also include various request characteristics 316 associated with the request 102, itself. For example, a request 102 may include various request fields 318 that store parameter values. Continuing the example, a request 102 may include a request field 318 that indicates a type or category associated with the request 102, such as an indication that the request 102 is a purchase transaction. Other request fields 318 may include an indication of the type of good or service that is purchased, an indication of a payment mechanism, an indication of a shipping or delivery mechanism, and so forth. The request characteristics 316 may include any number of request fields 318, each of which is associated with a corresponding field value 320. For example, FIG. 3 depicts a first request field 318(1) associated with a first field value 320(1), a second request field 318(2) associated with a second field value 320(2), and any number of additional request fields 318(N) associated with corresponding field values 320(N).

Request parameters 122 may also include a response code path 322 indicative of the particular code that is executed when processing a request 102 and generating a response 108. For example, the code that is executed to process a request 102 may include portions that are executed to process each request 102, as well as portions that are executed when processing some requests 102 but not executed when processing other requests 102. Continuing the example, the code associated with processing a request 102 may include nodes, junctions, or other conditional portions that may affect the particular portions of the code that are executed, such as an "if-then-else" statement. To process a first request 102, the initial processes 104 may execute a first set of code portions, while processing a second request 102 may cause a second set of code portions to be executed. The particular portions of the code that are executed when processing a request 102 may constitute the response code path 322 associated with the request 102. In some implementations, the response code path 322 may omit an indication of each line of code that is executed to process a request 102 and may instead include only an indication of the result of a conditional portion of the code or another type of junction. For example, the response code path 322 may include a hash of the results of each conditional portion of the code that was executed when processing a request 102 while omitting an indication of each other portion of the code, thus conserving the time and computational resources to determine, transmit, and compare the response code path 322 to the code executed with regard to other requests 102. An example of response code paths 322 is described with regard to FIG. 4.

Request parameters 122 may also include request processing metrics 324, such as latency, execution times, error rates, data throughput measurements, and other metric values associated with processing of a request 102. For example, a first request 102 and a second request 102 may include identical or substantially similar request parameters 122. However, if the first request 102 is processed, and a response 108 is generated in two milliseconds, while the second request 102 is processed and a response 108 is generated in ten seconds, the latency associated with the second request 102 may cause the second request 102 to be included in a different request subset 116 from the first request 102.

Other request parameters 326 may include types of data associated with the request 102, such as audio data, image data, or alphanumeric data. Other request parameters 326 may include security features associated with the request 102, a location associated with a destination of the request 102, a time or date at which the request 102 is received, and so forth. One or more of the other request parameters 326 may also be used to determine the request subsets 116 and test data 114.

Parameter weights 206 may include an indication of the importance of particular values for request parameters 122, expressed as a qualitative or quantitative value. For example, FIG. 3 depicts the parameter weights 206 associating a first request parameter 122(1) with a corresponding weight value 328(1), a second request parameter 122(2) with a corresponding weight value 328(2), and any number of additional request parameters 122(N) with corresponding weight values 328(N). The weight values 328 for each request parameter 122 may be used to determine whether a particular request 102 is included in a particular request subset 116. For example, requests 102 having common values for request parameters 122 associated with a high weight value 328 are more likely to be included in the same request subset 116.

Figure 4:
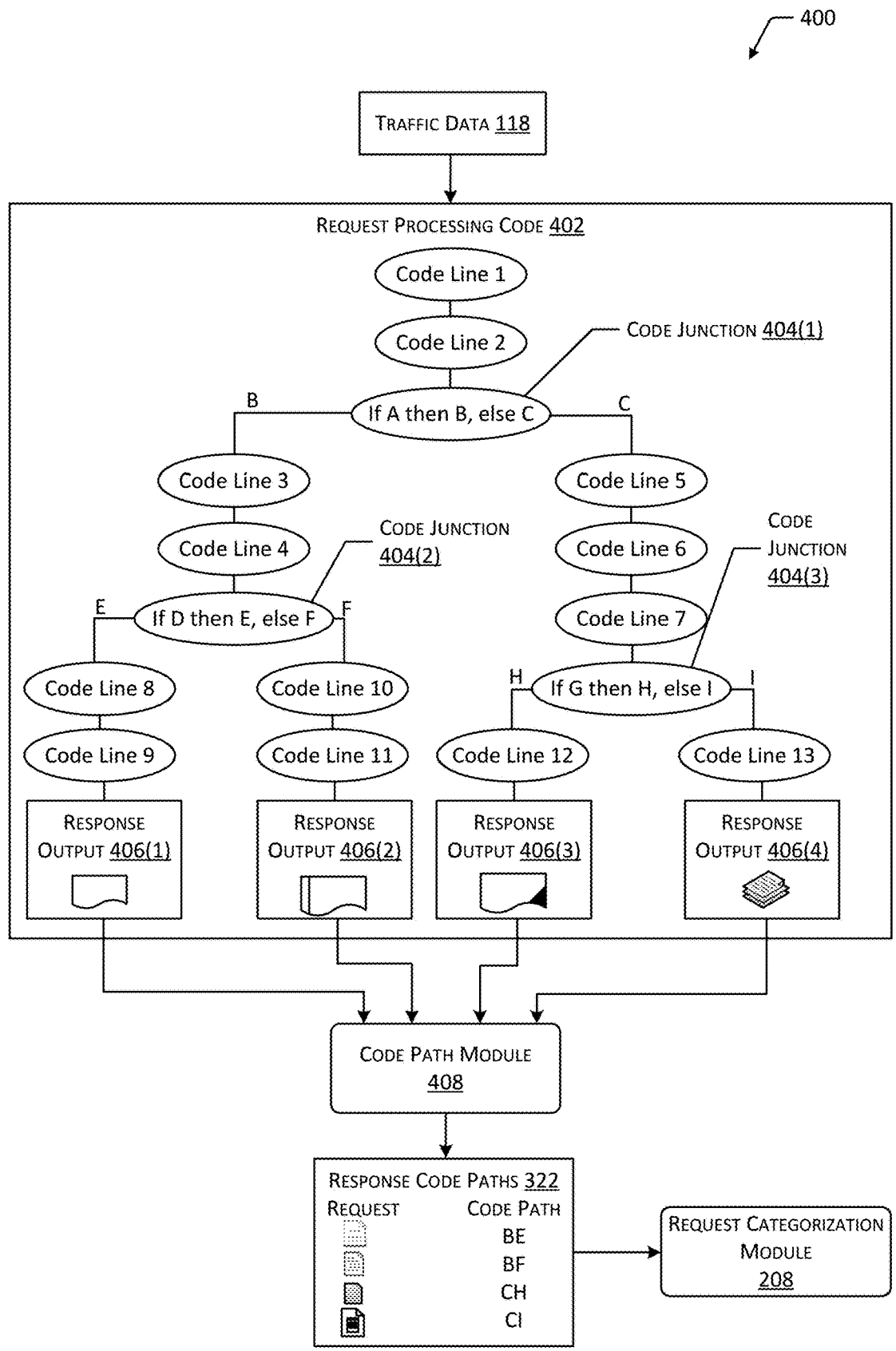
FIG. 4 is a diagram illustrating multiple code paths that may be executed when processing various requests and may be used to divide requests into subsets.

FIG. 4 is a diagram 400 illustrating multiple code paths that may be executed when processing various requests 102 and may be used to divide requests 102 into subsets. As described with regard to FIG. 3, one possible request parameter 122 for each request 102 may include the response code path 322 indicative of the code that was executed to process the request 102 to generate a response 108. For example, based on the characteristics of a request 102, the particular request processing code 402 that is executed may vary. Continuing the example, different services and processes, and different portions of various services and processes, may be used to process particular types of requests 102 and generate particular types of responses 108. In some cases, request processing code 402 may include one or more code junctions 404, such as conditional lines of code that may determine the subsequent lines of code that are executed based on characteristics of the request 102. For example, a code junction 404 may include an if-then-else statement, such that if a particular condition is true, a first set of code lines is executed, but if the condition is not true, a second set of code lines is executed. While FIG. 4 depicts use of if-then-else statements as one example code junction 404 having two possible outcomes, code junctions 404 may include join functions or any other type of executable code that may include multiple outcomes.

In the example diagram 400 shown in FIG. 4, the requests 102 indicated by the traffic data 118 that were received by a set of initial processes 104 may each be processed using request processing code 402. The example request processing code 402 includes a first code junction 404(1) having two possible outcomes (e.g., "B" and "C"), each outcome associated with the subsequent execution of different portions of the request processing code 402. Subsequent to executing code associated with the first outcome (e.g., "B"), the request processing code 402 includes a second code junction 404(2) associated with two possible outcomes (e.g., "E" and "F"). The first outcome (e.g., "E") may cause execution of code associated with generation of a first type response output 406(1). The second outcome (e.g., "F") may cause execution of code associated with generation of a second type of response output 406(2). FIG. 4 also depicts the request processing code 402 including a third code junction 404(3) associated with the second outcome (e.g., "C") of the first code junction 404(1). The third code junction 404(3) indicates two possible outcomes (e.g., "H" and "I"). The first outcome (e.g., "H") may cause execution of code associated with generation of a third type of response output 406(3), while the second outcome (e.g., "I")

may cause execution of code associated with generation of a fourth type of response output 406(4).

A code path module 408 associated with the test server(s) 112 may determine the particular request processing code 402 and response output 406 associated with at least a subset of the requests 102 of the traffic data 118, and based on this data, may determine the response code paths 322 for each request 102. In some implementations, the response code path 322 for each request 102 may include an indication of the outcomes of each code junction 404 executed when processing the request 102, while omitting an indication of other request processing code 402 that is executed when processing the request 102. Storing an indication of only the executed code junctions 404 and corresponding outcomes may conserve computational resources used to store and transmit data indicative of the response code paths 322, while retaining the portions of the executed request processing code 402 that may differentiate each request 102 of the traffic data 118 from other requests 102. In some implementations, a hash function may be applied to data indicative of the executed code junctions 404 and corresponding outcomes to determine one or more hash values, which may be compared to the hash values determined from other requests 102 when forming the request subsets 116.

Figure 5:
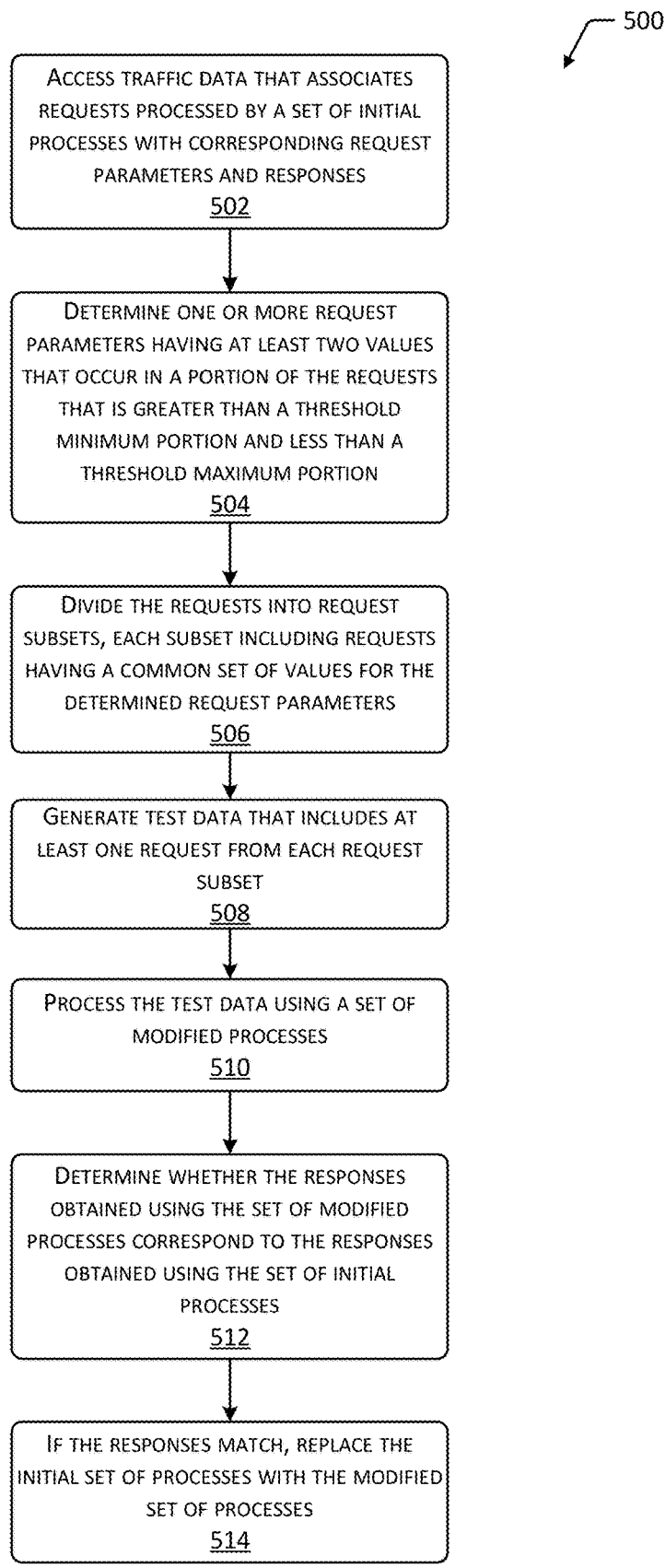
FIG. 5 is a flow diagram illustrating a method for generating test data to test a set of modified processes.

FIG. 5 is a flow diagram 500 illustrating a method for generating test data 114 to test a set of modified processes 106. At 502, traffic data 118 that associates requests 102 processed by a set of initial processes 104 with corresponding request parameters 122 and responses 108 may be accessed. As described with regard to FIGS. 1-2, a set of initial processes 104 may receive a potentially large number of requests 102 from one or more client devices 110 and may process the requests 102 to determine corresponding responses 108. Each request 102 may be associated with various request parameters 122, as described with regard to FIG. 3. For example, request parameters 122 may include source characteristics 302 indicative of hardware, software, locations, or network components associated with the sources of requests 102, field values 320 within various request fields 318, portions of code executed to process requests 102, or processing metrics associated with processing of the requests 102, such as latency, execution time, and so forth.

At 504, one or more request parameters 122 having at least two values that occur in a portion of the requests 102 that is greater than a threshold minimum portion and less than a threshold maximum portion may be determined. For example, if a particular value for a request parameter 122 is common to all or substantially all of the requests 102 processed by the initial processes 104, this request parameter 122 may not be useful for dividing the requests 102 into request subsets 116 based on the values for the request parameter 122. Similarly, if the values for a request parameter 122 are unique to all or substantially all of the requests 102, this request parameter 122 would not be useful for generating request subsets 116 due to each individual request 102 being grouped in a separate request subset 116 due to the differing unique value for the request parameter 122. However, request parameters 122 having at least two values across the requests 102 processed by the initial processes 104, in which the values occur in at least a threshold portion of the requests 102 without exceeding a threshold maximum portion may be used to group the requests 102 into request subsets 116 based on the values for the request parameters 122.

For example, at 506, the requests 102 may be divided into request subsets 116, each subset including requests 102 having a common set of values for the request parameters 122 determined at 504. Continuing the example, the initial processes 104 may receive 1,000 requests 102. If three request parameters 122 of importance are identified at 504, each request parameter 122 having two possible values (e.g., "A" or "B"), the requests 102 may be divided into eight request subsets 116 based on each set of common values (e.g., "AAA", "AAB", "ABA", "ABB", "BAA", "BAB", "BBA", and "BBB"). Any number of request parameters 122 having any number of possible values may be used to divide the requests 102 into request subsets 116.

At 508, test data 114 may be generated that includes at least one request 102 from each request subset 116. For example, if eight request subsets 116 are determined, as described in the previous example with regard to 506, the test data 114 may include eight requests 102, by selecting one request 102 from each request subset 116. In other implementations, more than one request 102 may be selected from one or more of the request subsets 116. Independent of the number of requests 102 from each request subset 116 that are included in the test data 114, the test data 114 may include a smaller number of requests 102 than the total number of requests 102 received by the set of initial processes 104. As such, the test data 114 may be processed more efficiently and using significantly fewer computational resources than the computational resources that would be used to process all of the requests 102 received by the initial processes 104.

At 510, the test data 114 may be processed using a set of modified processes 106. For example, one or more processes may be added to or removed from the initial processes 104, or one or more of the initial processes 104 may be changed, to generate the modified processes 106. However, prior to using the modified processes 106 to receive requests 102 and other production traffic, the modified processes 106 may be tested to determine whether processing of a request 102 by the modified processes 106 yields the same response 108 that would be determined by processing the request 102 using the initial processes 104. By processing the test data 114, which includes a representative sample request 102 from each request subset 116, the ability of the modified processes 106 to generate a proper response 108 to each type of request 102 represented by the request subsets 116 may be determined without testing all of the requests 102 received by the initial processes 104.

At 512, a determination may be made as to whether the responses 108 obtained using the set of modified processes 106 correspond to the responses 108 obtained using the set of initial processes 104. For example, based on the traffic data 118, the particular response 108 that was obtained for each request 102 included in the test data 114 may be determined. When a request 102 of the test data 114 is processed using the modified processes 106, the response 108 determined by the modified processes 106 may be compared to the response 108 indicated for that request 102 in the traffic data 118. If the two responses 108 correspond to one another within a threshold tolerance, then this determination may indicate that the modified processes 106 are capable of determining a proper response for each of the requests 102 associated with the same request subset 116 as the tested request 102.

At 514, if the responses 108 match, the set of initial processes 104 may be replaced with the set of modified processes 106. For example, if it is determined that the modified processes 106 are capable of determining a proper response 108 for each type of request 102 represented by the request subsets 116, this determination may indicate that the modified processes 106 are capable of determining a proper response 108 for each request 102 received by the initial processes 104. In other implementations, a potential modification to a set of initial processes 104 may be tested without necessarily modifying the initial processes 104. For example, one or more sets of modified processes 106 may be tested using the process described with regard to FIG. 5 without changing the initial processes 104.

Figure 6:
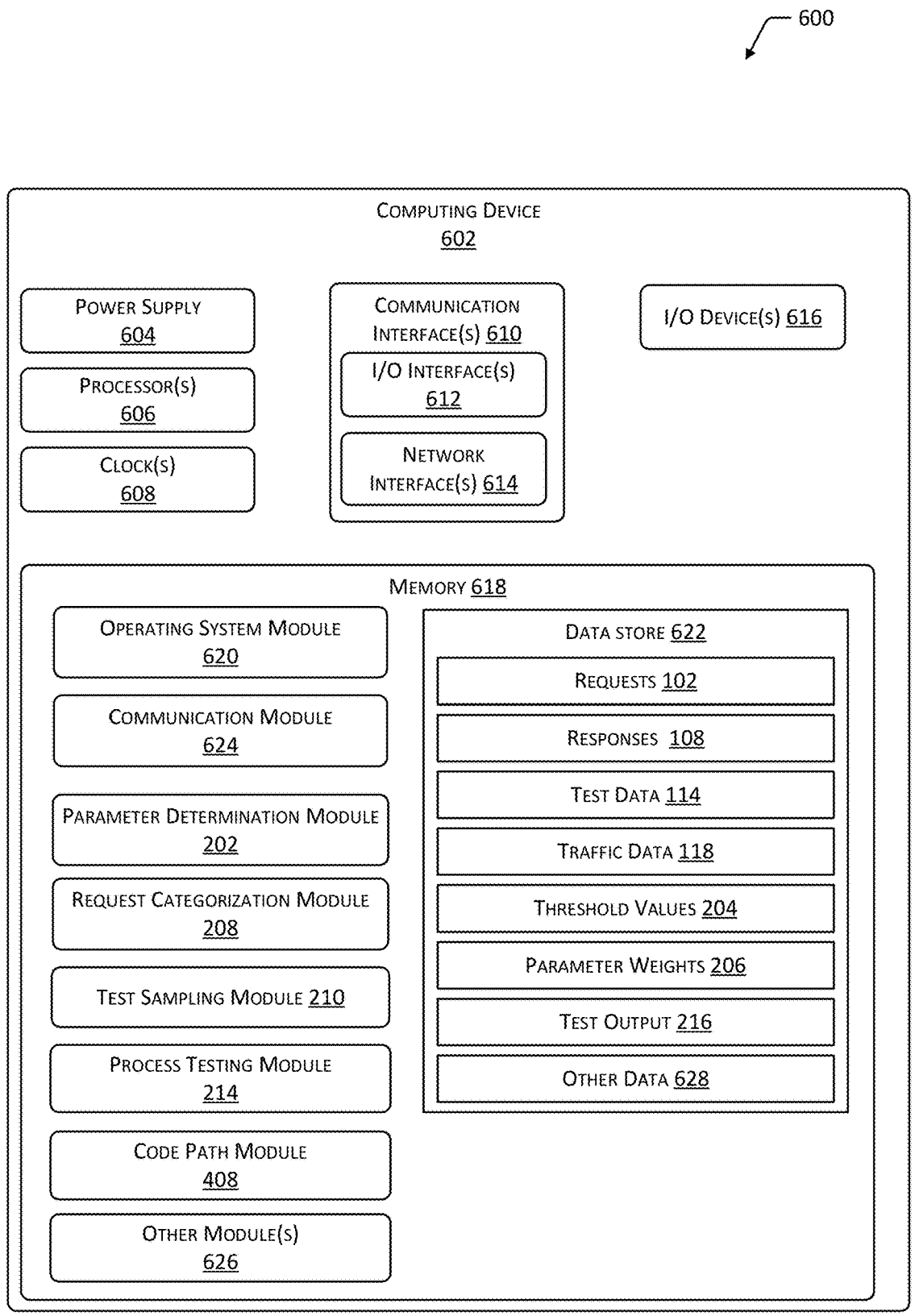
FIG. 6 is a block diagram illustrating a computing device within the scope of the present disclosure.

FIG. 6 is a block diagram 600 illustrating a computing device 602 within the scope of the present disclosure. While FIG. 6 depicts a single block diagram 600 illustrating a single example computing device 602, any number and any type of computing devices 602 may be used to perform the functions described herein. For example, the computing device(s) 602 may include one or more test servers 112, one or more servers or other types of computing devices 602 executing initial processes 104 or modified processes 106, one or more client devices 110, or one or more computing devices 602 in communication with a test server 112, process, or client device 110.

One or more power supplies 604 may be configured to provide electrical power suitable for operating the components of the computing device 602. In some implementations, the power supply 604 may include a rechargeable battery, fuel cell, photovoltaic cell, power conditioning circuitry, and so forth.

The computing device 602 may include one or more hardware processor(s) 606 (processors) configured to execute one or more stored instructions. The processor(s) 606 may include one or more cores. One or more clocks 608 may provide information indicative of date, time, ticks, and so forth. For example, the processor(s) 606 may use data from the clock 608 to generate a timestamp, trigger a preprogrammed action, and so forth.

The computing device 602 may include one or more communication interfaces 610, such as input/output (I/O) interfaces 612, network interfaces 614, and so forth. The communication interfaces 610 may enable the computing device 602, or components of the computing device 602, to communicate with other computing devices 602 or components of the other computing devices 602. The I/O interfaces 612 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 612 may couple to one or more I/O devices 616. The I/O devices 616 may include any manner of input device or output device associated with the computing device 602. For example, I/O devices 616 may include touch sensors, keyboards, mouse devices, microphones, image sensors (e.g., cameras), scanners, displays, speakers, haptic devices, printers, weight sensors, code readers, RFID devices, NFC devices, and so forth. In some implementations, the I/O devices 616 may be physically incorporated with the computing device 602 or may be externally placed.

The network interfaces 614 may be configured to provide communications between the computing device 602 and other devices, such as the I/O devices 616, routers, access points, and so forth. The network interfaces 614 may include devices configured to couple to one or more networks including local area networks (LANs), wireless LANs (WLANs), wide area networks (WANs), wireless WANs, and so forth. For example, the network interfaces 614 may include devices compatible with Ethernet, Wi-Fi, Bluetooth, ZigBee, Z-Wave, 3G, 4G, LTE, and so forth.

The computing device 602 may include one or more buses or other internal communications hardware or software that allows for the transfer of data between the various modules and components of the computing device 602.

As shown in FIG. 6, the computing device 602 may include one or more memories 618. The memory 618 may include one or more computer-readable storage media (CRSM). The CRSM may be any one or more of an electronic storage medium, a magnetic storage medium, an optical storage medium, a quantum storage medium, a mechanical computer storage medium, and so forth. The memory 618 may provide storage of computer-readable instructions, data structures, program modules, and other data for the operation of the computing device 602. A few example modules are shown stored in the memory 618, although the same functionality may alternatively be implemented in hardware, firmware, or as a system on a chip (SoC).

The memory 618 may include one or more operating system (OS) modules 620. The OS module 620 may be configured to manage hardware resource devices such as the I/O interfaces 612, the network interfaces 614, the I/O devices 616, and to provide various services to applications or modules executing on the processors 606. The OS module 620 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 622 and one or more of the following modules may also be associated with the memory 618. The modules may be executed as foreground applications, background tasks, daemons, and so forth. The data store(s) 622 may use a flat file, database, linked list, tree, executable code, script, or other data structure to store information. In some implementations, the data store(s) 622 or a portion of the data store(s) 622 may be distributed across one or more other devices including other computing devices 602, network attached storage devices, and so forth.

A communication module 624 may be configured to establish communications with one or more other computing devices 602. Communications may be authenticated, encrypted, and so forth.

The memory 618 may also store the parameter determination module 202. The parameter determination module 202 may determine traffic data 118 indicative of the requests 102 receive by processes, the request parameters 122 associated with the requests 102, and the responses 108 associated with the requests 102. Based on the values for at least a subset of the request parameters 122, the parameter determination module 202 may determine parameter weights 206 for one or more of the request parameters 122. In some implementations, the parameter weight 206 for a request parameter 122 may be determined based on a relationship between the frequency or portion of the requests 102 in which a particular value for a request parameter 122 occurs and one or more threshold values 204.

The memory 618 may additionally store the request categorization module 208. The request categorization module 208 may determine values for request parameters 122 of at least a subset of the requests 102 using the traffic data 118. Based on the values for at least a subset of the request parameters 122 and in some implementations, based in part on one or more parameter weights 206, the request categorization module 208 may divide the requests 102 into multiple request subsets 116. Each request subset 116 may include requests 102 having a common set of values for one or more request parameters 122.

The memory 618 may also store the test sampling module 210. The test sampling module 210 may generate test data 114 based on the determined request subsets 116. For example, the test sampling module 210 may select a single request 102, or in some implementations, multiple requests 102, from each request subset 116. The test data 114 may include any number of requests 102 less than the entire count of requests 102 represented in the traffic data 118.

The memory 618 may additionally store the process testing module 214. The process testing module 214 may provide the requests 102 of the test data 114 to a set of modified processes 106 and determine responses 108(2) from the modified processes 106. The process testing module 214 or the test sampling module 210 may also determine a set of expected responses 212 for the requests 102 of the test data 114 based on the traffic data 118. For example, the traffic data 118 may indicate the responses 108 that were generated for each request 102 of the test data 114 by a set of initial processes 104. The process testing module 214 may determine correspondence between the expected responses 212 and the responses 108(2) generated by the modified processes 106 and may generate a test output 216 indicative of this correspondence. Based on the test output 216, the capability of the modified processes 106 to properly process requests 102 received by a set of initial processes 104 may be determined.

Other modules 626 may also be present in the memory 618. For example, encryption modules may be used to encrypt and decrypt communications between computing devices 602. Authentication modules may be used to authenticate communications sent or received by computing devices 602. Other modules 626 may also include modules for soliciting and receiving user input, settings, configurations, modules for generating or processing requests 102, modules for receiving or modifying parameter weights 206 and threshold values 204, and so forth.

Other data 628 within the data store(s) 622 may include user input data, such as configurations and settings associated with computing devices 602. Other data 628 may also include encryption keys and schema, access credentials, and so forth.

In different implementations, different computing devices 602 may have different capabilities or capacities. For example, test servers 112 may have greater processing capabilities or data storage capacity than client devices 110.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
access traffic data, wherein the traffic data is indicative of a plurality of requests processed by a first plurality of processes to generate a first plurality of corresponding outputs;
determine, for at least a subset of the plurality of requests, respective values associated with a first parameter of a request;
determine that a first value occurs for a first subset of the plurality of requests, wherein the first subset includes a first quantity of the plurality of request that is greater than a threshold minimum quantity and less than a threshold maximum quantity;
determine that a second value occurs for a second subset of the plurality of requests, wherein the second subset includes a second quantity of the plurality of requests that is greater than the threshold minimum quantity and less than the threshold maximum quantity;
generate test data indicative of a first single request of the first subset and a second single request of the second subset;

determine, based on the traffic data, a first initial output associated with processing of the first single request by the first plurality of processes;
determine, based on the traffic data, a second initial output associated with processing of the second single request by the first plurality of processes;
generate a first test output by processing the first single request using a second plurality of processes;
determine first correspondence between the first test output and the first initial output;
generate a second test output by processing the second single request using the second plurality of processes;
determine second correspondence between the second test output and the second initial output; and
based on the first correspondence and the second correspondence, replace the first plurality of processes with the second plurality of processes.

2. The system of claim 1, wherein the first parameter includes an indication of at least one characteristic of a source of the request, and wherein the at least one characteristic includes one or more of: a location associated with the source, an application executed by the source, a device component of the source, or a network component associated with transmission of the request by the source.

3. The system of claim 1, wherein the first parameter includes an indication of one or more values associated with a data field of the request.

4. The system of claim 1, further comprising computer-executable instructions to:
determine at least a portion of process code executed by the first plurality of processes to generate a corresponding output associated with the request;
determine one or more code junctions associated with the at least a portion of the process code;
determine an outcome for at least a subset of the one or more code junctions; and
store an indication of the outcome, wherein the first parameter includes the outcome.

5. A method comprising:
accessing traffic data, wherein the traffic data is indicative of a plurality of requests processed by a first set of processes to generate one or more responses;
determining, based on the traffic data, respective values for a first parameter of the plurality of requests;
dividing the plurality of requests into at least a first subset and a second subset based on the respective values for the first parameter;
generating test data that includes at least a first request included in the first subset and at least a second request included in the second subset;
processing the first request using a second set of processes to determine a first process response;
processing the second request using the second set of processes to determine a second process response;
generating a test output indicative of correspondence between the first request, the second request, and the one or more responses; and
in response to the correspondence, replacing the first set of processes with the second set of processes.

6. The method of claim 5, further comprising:
determining, based on the traffic data, a first expected response for the first request when processed using the first set of processes; and
determining, based on the traffic data, a second expected response for the second request when processed using the first set of processes;
wherein the test output is indicative of the first process response matching the first expected response and the second process response matching the second expected response.

7. The method of claim 5, further comprising:
determining a first source associated with the first request;
determining one or more first characteristics of the first source;
determining a second source associated with the second request; and
determining one or more second characteristics of the second source;
wherein the respective values include a first value indicative of the one or more first characteristics and a second value indicative of the one or more second characteristics.

8. The method of claim 7, wherein the one or more first characteristics include one or more of: a device component of the first source, an application executed by the first source, a location associated with the first source, or a network component associated with transmission of requests by the first source.

9. The method of claim 5, further comprising:
determining a first value for a particular data field of the first request; and
determining a second value for the particular data field of the second request;
wherein the respective values for the first parameter include the first value for the first request and the second value for the second request.

10. The method of claim 5, further comprising:
determining one or more first processing metric values for processing of the first request; and
determining one or more second processing metric values for processing of the second request;
wherein the respective values for the first parameter include the one or more first processing metric values for the first request and the one or more second processing metric values for the second request.

11. The method of claim 10, wherein the one or more first processing metric values include an indication of one or more of: a latency measurement, an execution time measurement, an error rate measurement, or a data throughput measurement.

12. The method of claim 5, further comprising:
determining at least a portion of process code executed by the first set of processes to process the plurality of requests;
determining a first portion of the process code associated with processing of the first request; and
determining a second portion of the process code associated with processing of the second request;
wherein the respective values for the first parameter include an indication of the first portion for the first request and an indication of the second portion for the second request.

13. The method of claim 12, further comprising:
determining one or more code junctions included in the at least a portion of the process code; and
determining one or more outcomes associated with the one or more code junctions;
wherein the indication of the first portion includes an indication of one or more first outcomes associated with the first request and the indication of the second portion includes an indication of one or more second outcomes associated with the second request.

14. A system comprising:
one or more memories storing computer-executable instructions; and
one or more hardware processors to execute the computer-executable instructions to:
  access traffic data, wherein the traffic data is indicative of a plurality of requests processed by a first plurality of processes to generate a first plurality of outputs, and wherein the traffic data indicates respective values for one or more request parameters for at least a subset of the plurality of requests;
  divide the plurality of requests into at least a first subset and a second subset based on the respective values for the one or more request parameters;
  generate test data that includes at least one first request from the first subset and at least one second request from the second subset;
  process the test data using a second plurality of processes to generate one or more process outputs; and
  based on the one or more process outputs, replace the first plurality of processes with the second plurality of processes.

15. The system of claim 14, further comprising computer-executable instructions to:
  access parameter weights that associate respective weight values with the one or more request parameters;
  determine, based on the parameter weights and the respective values indicated by the traffic data, a first score indicating similarity between requests associated with the first subset; and
  determine, based on the parameter weights and the respective values indicated by the traffic data, a second score indicating similarity between requests associated with the second subset.

16. The system of claim 14, further comprising computer-executable instructions to:
  determine, based on the traffic data, a first value for a first request parameter of the one or more request parameters; and
  determine correspondence between the first value and user data that associates the first value with a second value for a second request parameter;
  wherein the plurality of requests is divided into the first subset and the second subset based on one or more values for the second request parameter.

17. The system of claim 14, wherein the one or more request parameters include one or more of: a latency, an execution time, an error rate, or a data throughput value associated with processing at least a portion of the plurality of requests.

18. The system of claim 14, further comprising computer-executable instructions to:
  determine correspondence between the one or more process outputs and one or more expected responses indicated in the traffic data; and
  generate a test output indicative of the correspondence between the one or more process outputs and the one or more expected responses, wherein the test output indicates a capability of the second plurality of processes to process a first type of request associated with the first subset and a second type of request associated with the second subset, and wherein the first plurality of processes is replaced with the second plurality of processes in response to the test output.

19. The system of claim 14, further comprising computer-executable instructions to:
  determine process code executed by the first plurality of processes to generate the first plurality of outputs; and
  determine that a first portion of the process code is executed by the first subset of the plurality of requests and a second portion of the process code is executed by the second subset of the plurality of requests, wherein the one or more request parameters include an indication of portions of the process code executed by requests.

20. The system of claim 19, further comprising computer-executable instructions to:
  determine a conditional element in the process code, wherein the conditional element is associated with at least two conditions; and
  determine that the first portion of the process code is associated with a first condition of the at least two conditions and the second portion of the process code is associated with a second condition of the at least two conditions.

* * * * *